US012222625B2

(12) United States Patent
Yeh et al.

(10) Patent No.: US 12,222,625 B2
(45) Date of Patent: Feb. 11, 2025

(54) DISPLAY DEVICE AND FABRICATION METHOD OF THE SAME

(71) Applicant: E Ink Holdings Inc., Hsinchu (TW)

(72) Inventors: Chia-Chun Yeh, Hsinchu (TW); Yi-Sheng Lin, Hsinchu (TW); Chen-Chu Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 621 days.

(21) Appl. No.: 17/581,862

(22) Filed: Jan. 22, 2022

(65) Prior Publication Data
US 2022/0357627 A1   Nov. 10, 2022

(30) Foreign Application Priority Data

May 6, 2021   (TW) .................................. 110116359

(51) Int. Cl.
*B32B 3/02*   (2006.01)
*B32B 27/28*   (2006.01)
*B32B 37/12*   (2006.01)
*G02F 1/167*   (2019.01)
*G02F 1/1679*   (2019.01)
*B32B 7/02*   (2019.01)
*B32B 27/06*   (2006.01)
*B32B 37/16*   (2006.01)
*B32B 38/00*   (2006.01)

(52) U.S. Cl.
CPC ............ *G02F 1/167* (2013.01); *B32B 27/281* (2013.01); *B32B 37/12* (2013.01); *G02F 1/1679* (2019.01); *B32B 7/02* (2013.01); *B32B 27/06* (2013.01); *B32B 37/16* (2013.01); *B32B 38/145* (2013.01); *B32B 2250/05* (2013.01); *B32B 2307/202* (2013.01); *B32B 2307/546* (2013.01); *B32B 2307/7246* (2013.01); *B32B 2307/7375* (2023.05); *B32B 2457/20* (2013.01); *G02F 2202/28* (2013.01)

(58) Field of Classification Search
CPC .... B32B 3/02; B32B 3/08; B32B 3/10; B32B 3/28; B32B 3/22; B32B 7/12; G02F 1/1679
See application file for complete search history.

(56) References Cited

U.S. PATENT DOCUMENTS 9,403,947 B2   8/2016   Katayama et al.
9,695,283 B2   7/2017   Katayama et al.
(Continued)

FOREIGN PATENT DOCUMENTS

CN   109166893 A   1/2019
TW   200641497 A   12/2006
(Continued)

OTHER PUBLICATIONS

Corresponding Taiwan office action issued on Dec. 2, 2021.

*Primary Examiner* — Elizabeth E Mulvaney
(74) *Attorney, Agent, or Firm* — CKC & Partners Co., LLC

(57) ABSTRACT

A display device includes a driving substrate, an electronic ink layer, and a conductive barrier layer. The electronic ink layer is located on the driving substrate. The conductive barrier layer is located on the electronic ink layer, the conductive barrier layer includes a conductive layer and a base layer, the conductive layer is located between the base layer and the electronic ink layer, and the conductive layer is separated from the electronic ink layer.

20 Claims, 9 Drawing Sheets

(56) References Cited

U.S. PATENT DOCUMENTS

| | | |
|---|---|---|
| 9,766,763 B2 | 9/2017 | Jinbo et al. |
| 9,868,823 B2 | 1/2018 | Katayama et al. |
| 10,777,101 B2 | 9/2020 | Park |
| 11,906,871 B2 * | 2/2024 | Huang .................... G02F 1/167 |
| 2013/0258447 A1 * | 10/2013 | Wu ......................... B32B 38/00 |
| | | 156/292 |
| 2019/0369435 A1 | 12/2019 | Yin et al. |

FOREIGN PATENT DOCUMENTS

| | | |
|---|---|---|
| TW | 201142773 A | 12/2011 |
| WO | 2006059256 A1 | 6/2006 |

* cited by examiner

DISPLAY DEVICE AND FABRICATION METHOD OF THE SAME

CROSS-REFERENCE TO RELATED APPLICATION

This application claims priority to Taiwan Application Serial Number 110116359, filed May 6, 2021, which is herein incorporated by reference in its entirety.

BACKGROUND

Field of Invention

The present invention relates to a display device and a manufacturing method of the display device.

Description of Related Art

The electronic ink layer and the driving electrodes of the current display device are manufactured as one piece. Therefore, it is necessary to dispose a protection film that can resist ultraviolet light and water and can drive the electronic ink layer so as to cover the electronic ink layer and the driving electrode layer.

However, the protection film is required to cover the top surfaces and the side walls of the electronic ink layer and the driving electrode layer, and therefore it is difficult to manufacture thinned display device and the protection film will have wedge shape. As a result, peeling off of the protection film due to adhesive failure caused by stress when the display device is bent will occur.

Accordingly, it is still a development direction for the industry to provide a thinned display device which may avoid the adhesive failure or function failure of the display device due to stress.

SUMMARY

The invention provides a display device.

In some embodiments, the display device includes a driving substrate, an electronic ink layer, and a conductive barrier layer. The electronic ink layer is located on the driving substrate. The conductive barrier layer is located on the electronic ink layer, the conductive barrier layer includes a conductive layer and a base layer, the conductive layer is located between the base layer and the electronic ink layer, and the conductive layer is separated from the electronic ink layer.

In some embodiments, the conductive barrier layer further includes a vapor barrier layer located between the conductive layer and the base layer.

In some embodiments, an area of an orthogonal projection of the conductive barrier layer on the driving substrate is greater than an area of the orthogonal projection of the electronic ink layer on the driving substrate.

In some embodiments, the base layer includes colorless polyimide (CPI).

In some embodiments, the display device further includes an adhesive layer located between the electronic ink layer and the conductive barrier layer.

In some embodiments, the display device further includes a sealant located between the driving substrate and the conductive barrier layer, and the sealant surrounds the electronic ink layer.

In some embodiments, a stiffness of the sealant is smaller than 500 MPa.

In some embodiments, a water vapor transmission rate (WVTR) is smaller than 12 g/m2/day.

In some embodiments, a viscosity of the sealant is smaller than 2000 Pa·s.

In some embodiments, the display device further includes a functional thin film disposed on the conductive barrier layer and a housing surrounding the driving substrate, the electronic ink layer, the conductive barrier layer, and the functional thin film. A width of the functional thin film is smaller than or equal to a width of the conductive barrier layer, and the housing extends onto a surface of the functional thin film facing away from the conductive barrier layer.

In some embodiments, the functional thin film includes a first cover structure and a second cover structure, the first cover structure is located between the second cover structure and the conductive barrier layer, and a width of the second cover structure is smaller than a width of the first cover structure.

In some embodiments, the display device further includes a functional thin film disposed on the conductive barrier layer, a width of the functional thin film is greater than a width of the conductive barrier layer, and a difference between the width of the functional thin film and the width of the conductive barrier layer is greater 3 mm.

In some embodiments, the first cover structure is located between the second cover structure and the conductive barrier layer, and a width of the second cover structure is greater than a width of the first cover structure. The display device further includes a housing surrounding the driving substrate, the electronic ink layer, the conductive barrier layer, and the first cover structure, and the housing is located below the second cover structure.

In some embodiments, the functional thin film includes a first cover structure and a second cover structure, the first cover structure is located between the second cover structure and the conductive barrier layer, and the display device further includes a housing surrounding the driving substrate, the electronic ink layer, the conductive barrier layer, and the housing is located below the first cover structure.

Another aspect of the present disclosure is a fabrication method of display device.

In some embodiments, the fabrication method of the display device includes forming an electronic ink layer on a driving substrate; providing a conductive barrier layer, wherein the conductive barrier layer includes a conductive layer located on the base layer; and adhering the electronic ink layer formed on the driving substrate and the conductive layer through an adhesive layer, and the adhesive layer is located between the electronic ink layer and the conductive barrier layer.

In some embodiments, providing the conductive barrier layer further includes disposing a vapor barrier layer located between the base layer and the conductive layer.

In some embodiments, the fabrication method of the display device further includes disposing a sealant between the driving substrate and the conductive barrier layer, and the sealant surrounds the electronic ink layer.

In some embodiments, the fabrication method of the display device further includes disposing a functional thin film on the driving substrate or the conductive barrier layer.

In some embodiments, a width of the functional thin film is smaller than or equal to a width of the conductive barrier layer, and the fabrication method of the display device further includes disposing a housing surrounding the driving substrate, the electronic ink layer, the conductive barrier layer, and the functional thin film such that the housing extends onto a surface of the functional thin film facing away from the conductive barrier layer.

In some embodiments, a width of the functional thin film is greater than a width of the conductive barrier layer, and a difference between the width of the functional thin film and the width of the conductive barrier layer is greater 3 mm, and the fabrication method of the display device further includes disposing a housing surrounding the driving substrate, the electronic ink layer, and the conductive barrier layer, wherein the housing is located below the functional thin film.

In the aforementioned embodiments, there is no need to dispose a protection film covering the surface of the conductive barrier layer facing away from the electronic ink layer and a side wall of the conductive barrier layer through the method of disposed the conductive barrier layer that can that can resist ultraviolet light and water and can drive the electronic ink layer, and therefore the thickness of the display device can be reduced. As such, the display device can have better foldability, and therefore the fatigue damage of the display device due to repeated bending can be reduced. In addition, such structure can be applied in non-planar display device or overall planar display device so as to avoid failure of the display device caused by the stress applied on each layers when the display device is bent.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
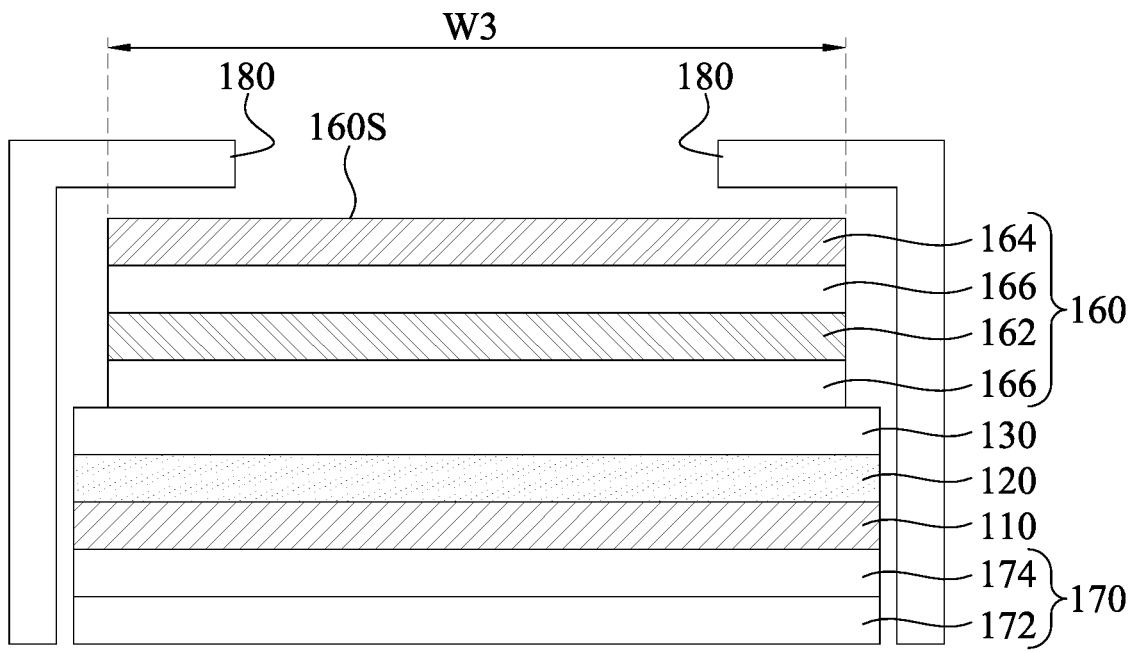
FIG. 1 is a cross-sectional view of a display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a display device 100 according to one embodiment of the present disclosure. The display device 100 includes a driving substrate 110, an electronic ink layer 120, and a conductive barrier layer 130. The electronic ink layer 120 is located on the driving substrate 110. The conductive barrier layer 130 is located on the electronic ink layer 120. The display device 100 of the present disclosure can be foldable display device.

Figure 2:
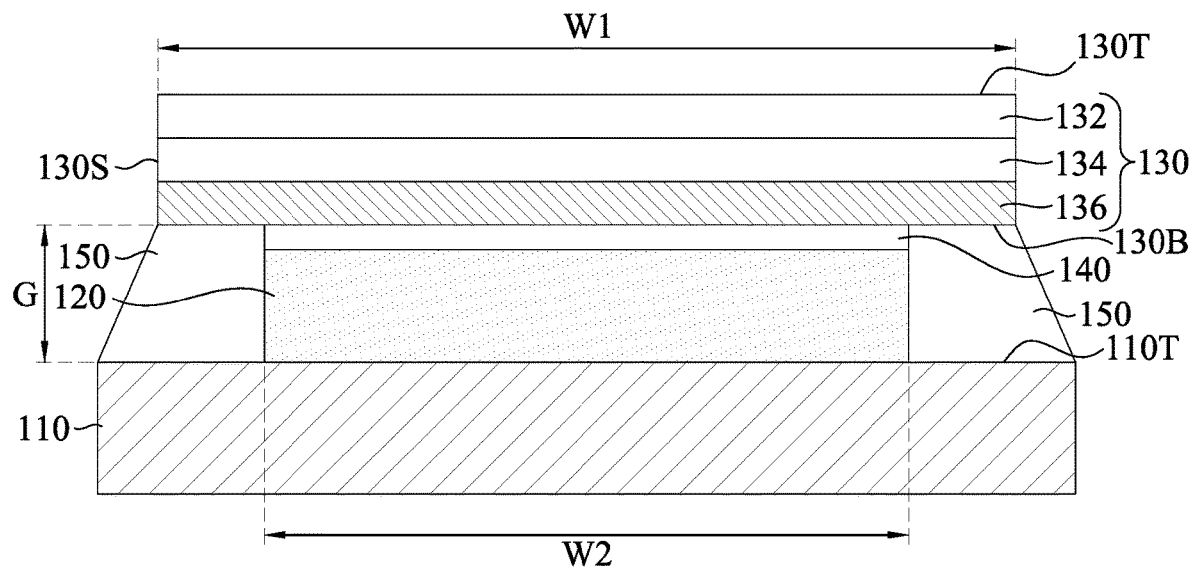
FIG. 2 is a partial cross-sectional view of the display device shown in FIG. 1.

FIG. 2 is a partial cross-sectional view of the display device 100 shown in FIG. 1. The display device 100 further includes an adhesive layer 140 and a sealant 150. The adhesive layer 140 is located between the electronic ink layer 120 and the conductive barrier layer 130. The conductive barrier layer 130 includes a base layer 132, a vapor barrier layer 134, and a conductive layer 136. The conductive layer 136 is located between the vapor barrier layer 134 and the electronic ink layer 120. The vapor barrier layer 134 is located between the base layer 132 and the conductive layer 136. In other words, the conductive layer 136 is separated from the electronic ink layer 120.

The base layer 132 includes colorless polyimide (CPI). Since the ultraviolet transmittance of the colorless polyimide is lower, the base layer 132 can be ultraviolet resistant. Therefore, there is no need to dispose an ultraviolet resistant film on the conductive barrier layer 130. The conductive layer 136 is configured to control the electrodes of the electronic ink layer 120. Since the conductive layer 136 is formed on the vapor barrier layer 134 and the base layer 132, and therefore the size of the conductive layer 136 is substantially the same as the sizes of the vapor barrier layer 134 and the base layer 132.

In other words, since the base layer 132, the vapor barrier layer 134, and the conductive layer 136 of the display device 100 of the present disclosure are integrated as an integration film that can resist ultraviolet light and water and can drive the electronic ink layer 120. Therefore, the conductive layer 136 of the conductive barrier layer 130 is not formed directly on the electronic ink layer 120. As such, the size of the conductive barrier layer 130 can be greater than the size of the electronic ink layer 120. As shown in FIG. 2, an area of an orthogonal projection of the conductive barrier layer 130 on the driving substrate 110 is greater than an area of the orthogonal projection of the electronic ink layer 120 on the driving substrate 110. In addition, a width W1 of the conductive barrier layer 130 is greater than a width W2 of the electronic ink layer 120. With such design, there is no need to dispose a protection film covering the surface 130T of the conductive barrier layer 130 facing away from the electronic ink layer 120 and a side wall 130S of the conductive barrier layer 130, and therefore the thickness of the display device 100 can be reduced. For example, in one embodiment, the thickness of the display device 100 can be reduced from about 163 um to about 107 um. As such, the display device 100 can have better foldability. For example, the folding radius of the display device 100 can be reduced from a value greater than about 10 um to a value smaller than or equal to about 4 um, and therefore the fatigue damage of the display device 100 due to repeated bending can be reduced.

Reference is made to FIG. 2, the sealant 150 is located between the driving substrate 110 and the conductive barrier layer 130, and the sealant 150 surrounds the electronic ink layer 120. Specifically, the sealant 150 is located between the surface 130B of the conductive barrier layer 130 facing the electronic ink layer 120 and the surface 110T of the driving substrate 110 facing the electronic ink layer 120, and the sealant 150 does not extend to the side wall 130S of the conductive barrier layer 130 or the surface 130T of the conductive barrier layer 130 facing away from the electronic ink layer 120. As such, display device 100 a wedge-shaped protection film covering the electronic ink layer 120 (that is, the protection film covering the surface 130T of the conductive barrier layer 130 facing away from the electronic ink layer 120 and a side wall 130S of the conductive barrier layer 130 mentioned above), thereby preventing the peeling off of the protection film due to adhesive failure caused by stress when the display device 100 is bent.

In the present embodiment, a stiffness of the sealant 150 is smaller than 500 MPa·such that the sealant 150 can endure stress when the display device 100 is bent. The viscosity of the sealant 150 is smaller than 2000 Pa·s such that the sealant 150 can efficiently permeate to the gap G between the conductive barrier layer 130 and the driving substrate 110, and the electronic ink layer 120 can be sealed through an edge sealing method. In some embodiments, the gap G between the conductive barrier layer 130 and the driving substrate 110 is about 55 um. The water vapor transmission rate (WVTR) of the sealant 150 is smaller than 12 g/m2/day such that an effective water resistant distance is smaller than 1.2 mm, and therefore vapor is prevented from permeating into the electronic ink layer 120. With such design, the waterproof property of the display device 100 can be maintained.

Reference is made to FIG. 1, the display device 100 further includes a functional thin film 160 disposed on the conductive barrier layer 130, another functional thin film 170 disposed on the driving substrate 110, and a housing 180. The functional thin film 160 is a cover structure, and the functional thin film 160 includes a first cover structure 162 and a second cover structure 164. The first cover structure 162 and the second cover structure 164 are adhered with each other through an optical adhesive layer 166, and the first cover structure 162 and the conductive barrier layer 130 are adhered with each other through another adhesive layer 166. The functional thin film 170 includes a protection layer 172 and another optical adhesive layer 174 adhering the protection layer 172 onto the driving substrate 110. The functional thin films 160, 170 mentioned above are merely examples, and the present disclosure are not limited in these regards.

In the present embodiment, a width W3 of the functional thin film 160 is smaller than or equal to a width W1 of the conductive barrier layer 130 (see FIG. 2). The housing 180 surrounds the driving substrate 110, the electronic ink layer 120, the conductive barrier layer 130, and the functional thin films 160, 170. The housing 180 extends onto a surface 160S of the functional thin film 160 facing away from the conductive barrier layer 130. In other words, the display device 100 of the present embodiment is not an overall planar design. Failure of the display device 100 caused by the stress applied by the shaft bearing and the housing 180 on each layers when the display device 100 is bent can be avoided through providing the functional thin film 160 of which the width W3 is smaller than the widths of the conductive barrier layer 130 and the driving substrate 110.

Figure 3:
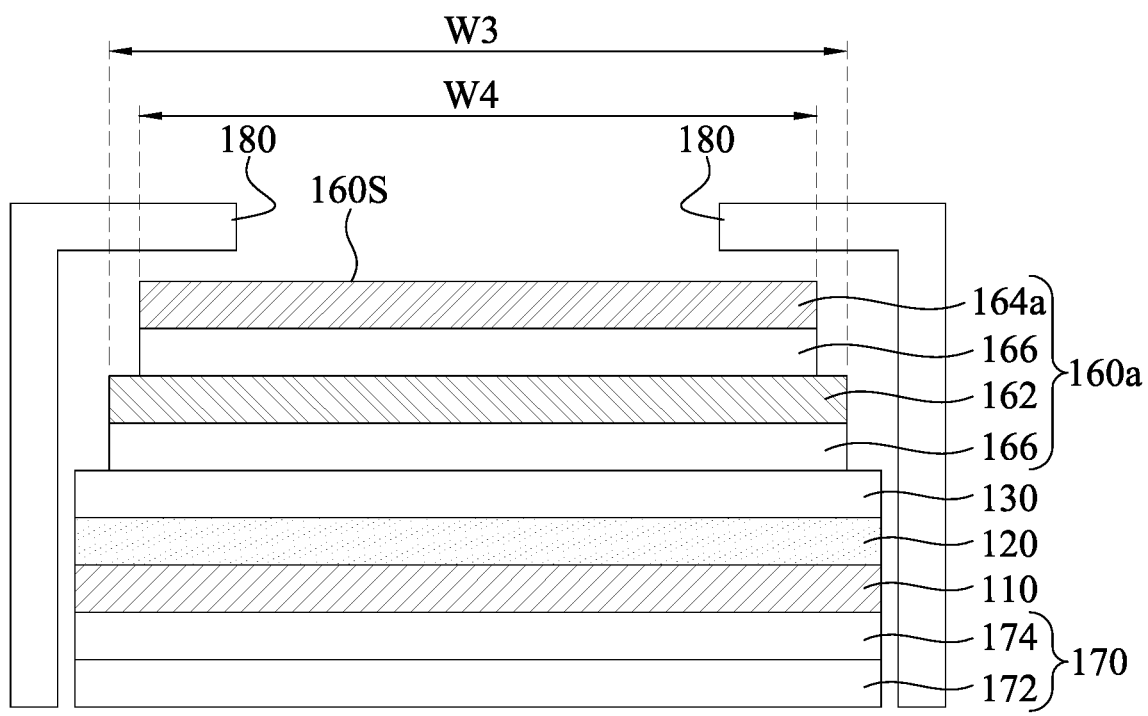
FIG. 3 is a cross-sectional view of another display device according to one embodiment of the present disclosure.

FIG. 3 is a cross-sectional view of another display device 100a according to one embodiment of the present disclosure. The display device 100a is substantially the same as the display device 100 shown in FIG. 1, and the difference is that a width W4 of the second cover structure 164a of the functional thin film 160a of the display device 100a is smaller than a width W3 of the first cover structure 162. Failure of the display device 100a caused by the stress applied by the shaft bearing and the housing 180 on each layers when the display device 100 is bent can be avoided through reducing the width W4 of the second cover structure 164a. The display device 100a has the same advantages as those of the display device 100, and the description is not repeated hereinafter.

Figure 4:
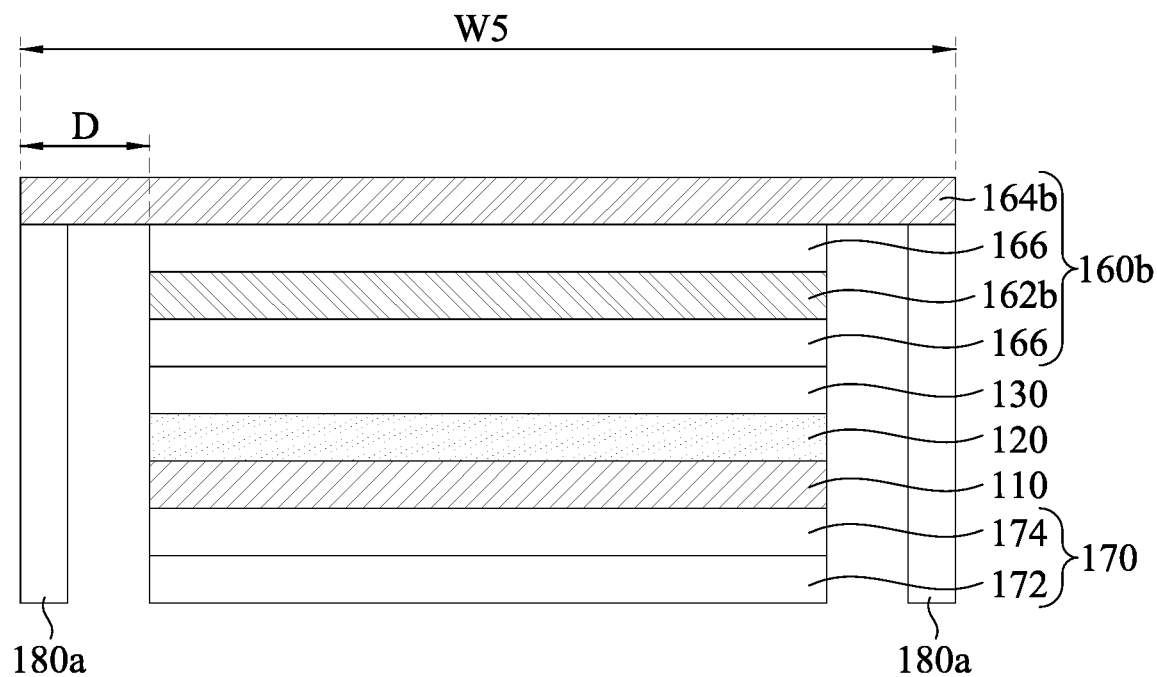
FIG. 4 is a cross-sectional view of another display device according to one embodiment of the present disclosure.

FIG. 4 is a cross-sectional view of another display device 100b according to one embodiment of the present disclosure. The display device 100b is substantially the same as the display device 100 shown in FIG. 1, and the difference is that a width W5 of the second cover structure 164b of the functional thin film 160b of the display device 100b is smaller than a width W1 of the conductive barrier layer 130 (see FIG. 2), and the width of the first cover structure 162b is substantially the same as the width W1 of the conductive barrier layer 130. The difference D between the width W5 of the second cover structure 164b and the width W1 of the conductive barrier layer 130 is greater than 3 mm. The housing 180a surrounds the driving substrate 110, the electronic ink layer 120, the conductive barrier layer 130, and the first cover structure 162b, and the housing 180a is located below the second cover structure 164b. In other words, the display device 100b of the present embodiment is an overall planar design. Peeling off between the interfaces of the display device 100b caused by the wavy deformation due to bending stress when the display device 100b is bent can be avoided, thereby avoid failure of the display device 100b.

Figure 5:
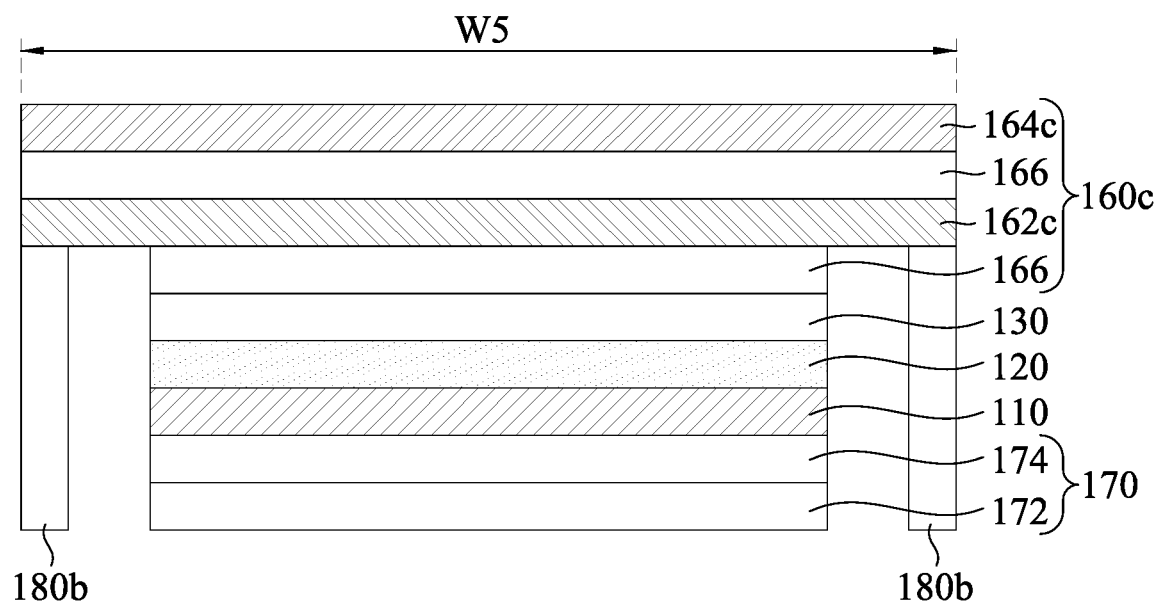
FIG. 5 is a cross-sectional view of another display device according to one embodiment of the present disclosure.

FIG. 5 is a cross-sectional view of another display device 100c according to one embodiment of the present disclosure. The display device 100c is substantially the same as the display device 100b, and the difference is that the first cover structure 162c and the second cover structure 164c of the functional thin film 160c of the display device 100c have the same width W5. The housing 180b surrounds the driving substrate 110, the electronic ink layer 120, and the conductive barrier layer 130, and the housing 180b is located below the first cover structure 162c. The display device 100c has the same advantages as those of the display device 100b, and the description is not repeated hereinafter.

Figure 6:
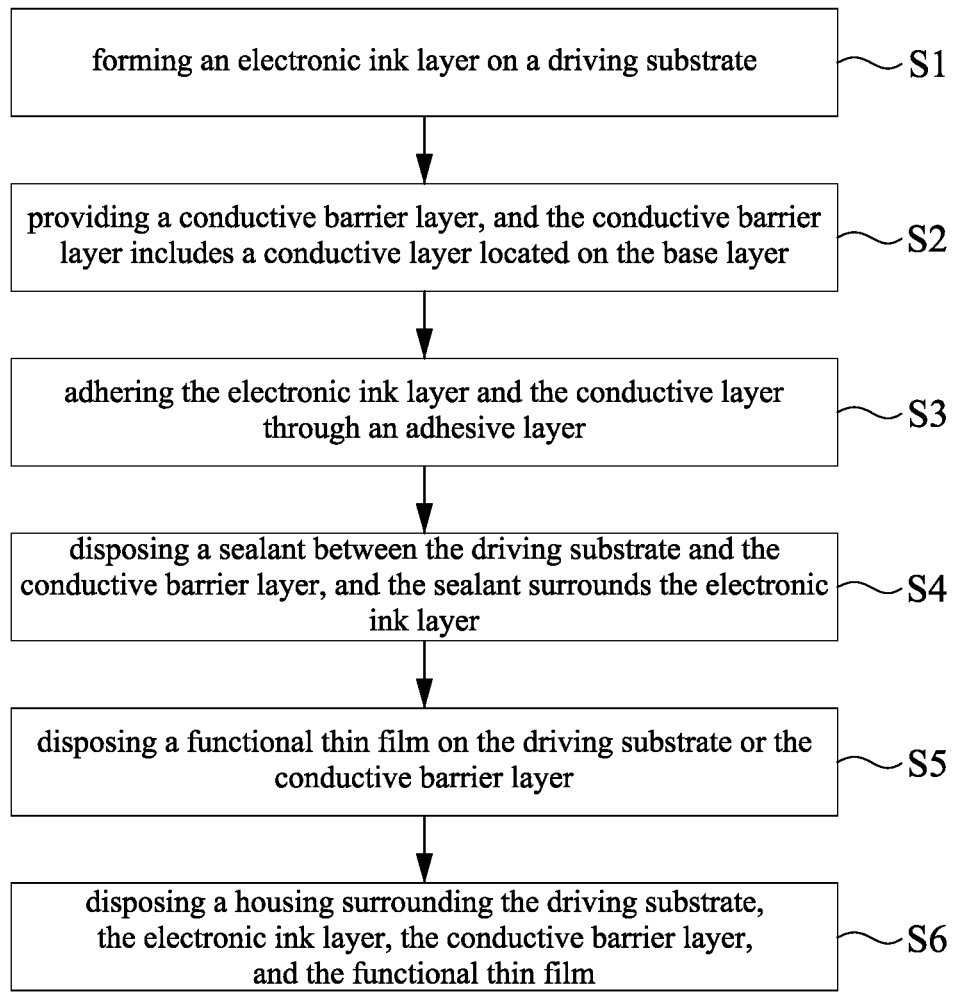
FIG. 6 is a flow chart of a fabrication method of a display device according to one embodiment of the present disclosure.
Figure 7:
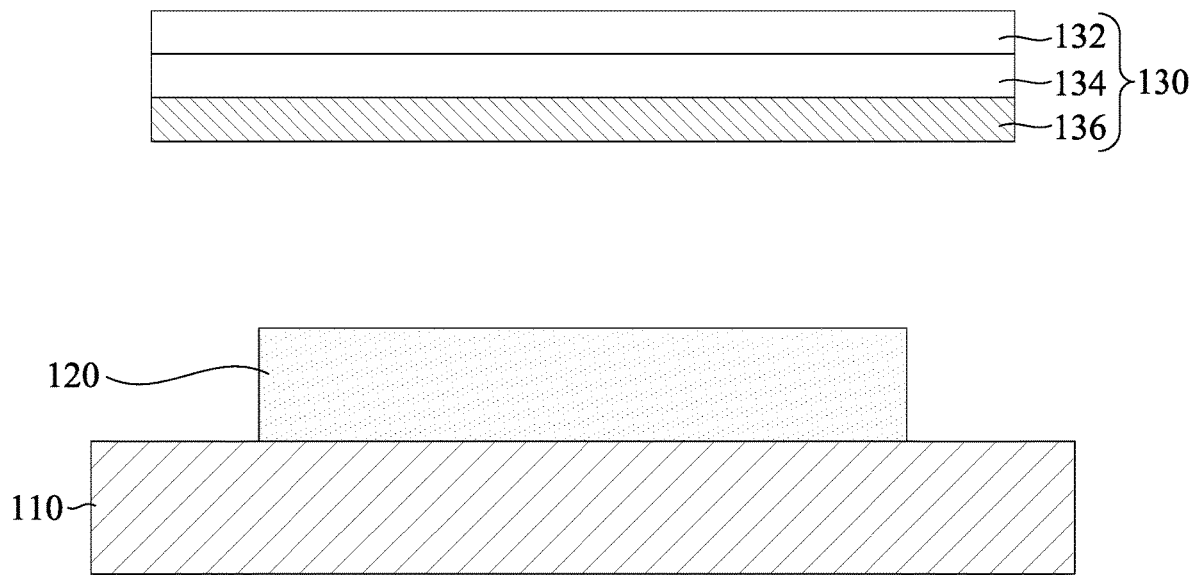
FIG. 7 to FIG. 9 are cross-sectional views of intermediate steps of the fabrication method of display device shown in FIG. 6.
Figure 8:
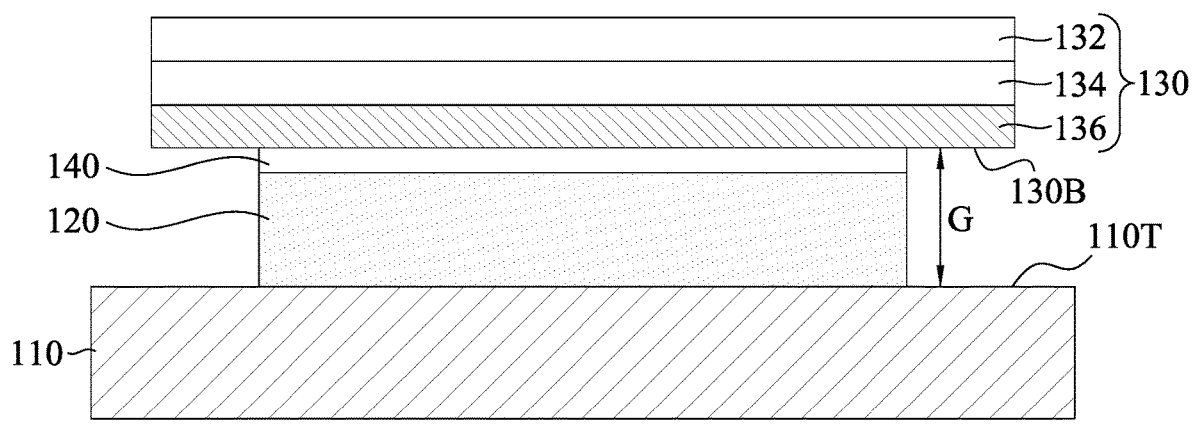
Figure 9:
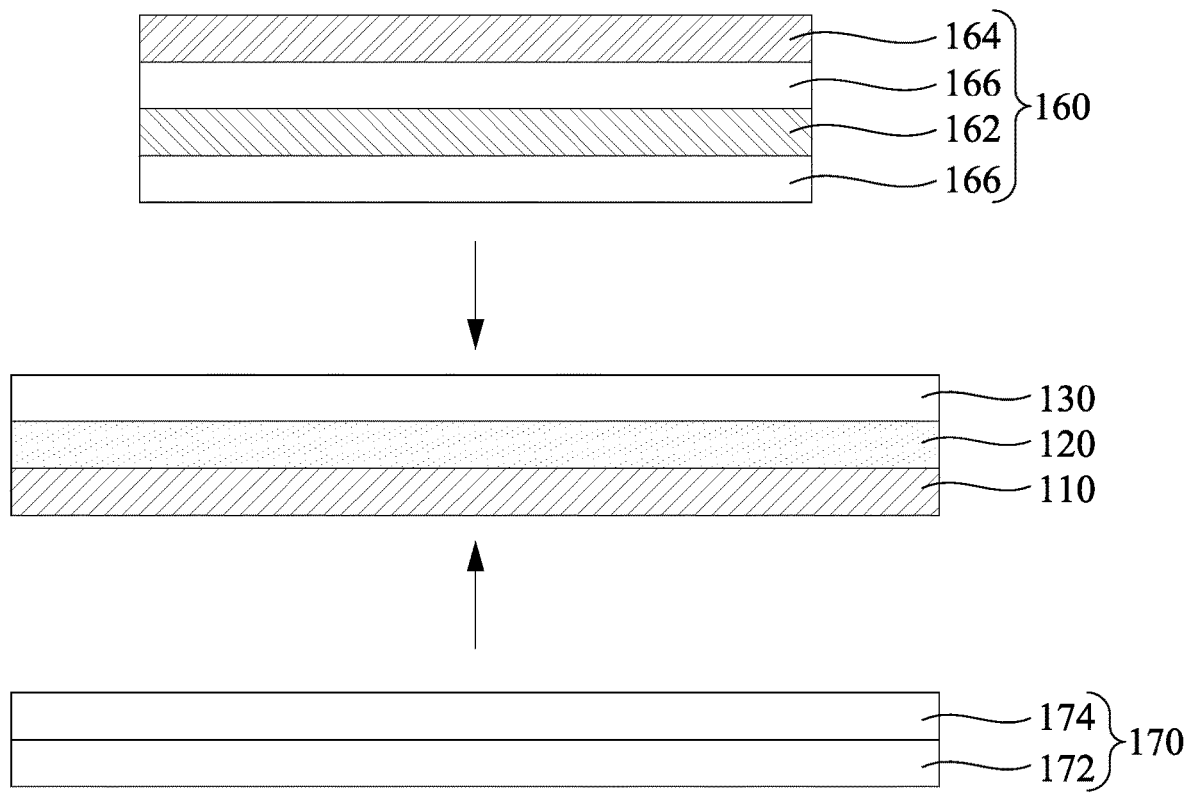

FIG. 6 is a flow chart of a fabrication method of a display device according to one embodiment of the present disclosure. FIG. 7 to FIG. 9 are cross-sectional views of intermediate steps of the fabrication method of display device shown in FIG. 6. Reference is made to FIG. 6 and FIG. 7 simultaneously. The manufacturing method starts from step S1, of which the electronic ink layer 120 is formed on the driving substrate 110. In step S2, the conductive barrier layer 130 is provided, and the conductive barrier layer 130 is located on the conductive layer 136 located on the base layer 132. Step S2 includes disposing the vapor barrier layer 134 on the base layer. In other words, the vapor barrier layer 134 is formed on the base layer first, and then the conductive layer 136 is formed on the vapor barrier layer 134 later. Sequence of step S1 and step S2 can be exchanged, and the technical advantages of the manufacturing method are not affected. As described above, since the conductive layer 136 is integrated in the conductive barrier layer 130, the size of the conductive barrier layer 130 can be greater than the size of the electronic ink layer 120.

Reference is made to FIG. 6 and FIG. 8 simultaneously. In step S3, the electronic ink layer 120 and the conductive layer 136 are adhered through the adhesive layer 140. Since the size of the conductive barrier layer 130 is greater than the size of the electronic ink layer 120, the gap G can be formed between the surface 130b of the conductive barrier layer 130 facing the electronic ink layer 120 and the surface 110T of the driving substrate 110 facing the electronic ink layer 120.

Reference is made to FIG. 6 and FIG. 2 simultaneously. In step S4, the sealant 150 is disposed between the driving substrate 110 and the conductive barrier layer 130, and the sealant 150 surrounds the electronic ink layer 120. As described above, the electronic ink layer 120 can be sealed by the sealant 150 through the edge sealing method.

Reference is made to FIG. 6 and FIG. 9 simultaneously. In step S5, functional thin films 160, 170 are disposed below the driving substrate 110 or above conductive barrier layer 130. In the present embodiment, the cover structure of the display device 100 shown in FIG. 1 is used as an example.

In other embodiments, the functional thin film 160 can be the cover structures shown in FIG. 3 to FIG. 5.

Reference is made to FIG. 6 and FIG. 1 simultaneously. In step S6, the housing 180 is disposed to surround the driving substrate 110, the electronic ink layer 120, the conductive barrier layer 130, and the functional thin films 160, 170. In the present embodiment, the housing 180 shown in FIG. 1 is used as an example. In other embodiments, the housing 180a shown in FIG. 4 or the housing 180b shown in FIG. 5 can also be used as the housing herein.

In summary, there is no need to dispose a protection film covering the surface of the conductive barrier layer facing away from the electronic ink layer and a side wall of the conductive barrier layer through the method of disposed the conductive barrier layer that can that can resist ultraviolet light and water and can drive the electronic ink layer, and therefore the thickness of the display device can be reduced. As such, the display device can have better foldability, and therefore the fatigue damage of the display device due to repeated bending can be reduced. In addition, such structure aforementioned can be applied in non-planar display device or overall planar display device so as to avoid failure of the display device caused by the stress applied on each layers when the display device is bent.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a driving substrate;
   an electronic ink layer located on the driving substrate; and
   a conductive barrier layer located on the electronic ink layer, wherein the conductive barrier layer comprises a conductive layer and a base layer, the conductive layer is located between the base layer and the electronic ink layer, and the conductive layer is separated from the electronic ink layer.

2. The display device of claim 1, wherein the conductive barrier layer further comprises a vapor barrier layer located between the conductive layer and the base layer.

3. The display device of claim 1, wherein an area of an orthogonal projection of the conductive barrier layer on the driving substrate is greater than an area of the orthogonal projection of the electronic ink layer on the driving substrate.

4. The display device of claim 1, wherein the base layer comprises colorless polyimide (CPI).

5. The display device of claim 1, further comprising:
   an adhesive layer located between the electronic ink layer and the conductive barrier layer.

6. The display device of claim 1, further comprising:
   a sealant located between the driving substrate and the conductive barrier layer, and the sealant surrounds the electronic ink layer.

7. The display device of claim 6, wherein a stiffness of the sealant is smaller than 500 MPa.

8. The display device of claim 6, wherein a water vapor transmission rate (WVTR) is smaller than 12 g/m2/day.

9. The display device of claim 6, wherein a viscosity of the sealant is smaller than 2000 Pa·s.

10. The display device of claim 1, further comprising:
    a functional thin film disposed on the conductive barrier layer, and a width of the functional thin film is smaller than or equal to a width of the conductive barrier layer; and
    a housing surrounding the driving substrate, the electronic ink layer, the conductive barrier layer, and the functional thin film, wherein the housing extends onto a surface of the functional thin film facing away from the conductive barrier layer.

11. The display device of claim 10, wherein the functional thin film comprises a first cover structure and a second cover structure, the first cover structure is located between the second cover structure and the conductive barrier layer, and a width of the second cover structure is smaller than a width of the first cover structure.

12. The display device of claim 1, further comprising:
    a functional thin film disposed on the conductive barrier layer, a width of the functional thin film is greater than a width of the conductive barrier layer, and a difference between the width of the functional thin film and the width of the conductive barrier layer is greater 3 mm.

13. The display device of claim 12, wherein the functional thin film comprises a first cover structure and a second cover structure, the first cover structure is located between the second cover structure and the conductive barrier layer, and a width of the second cover structure is greater than a width of the first cover structure, and the display device further comprises:
    a housing surrounding the driving substrate, the electronic ink layer, the conductive barrier layer, and the first cover structure, wherein the housing is located below the second cover structure.

14. The display device of claim 12, wherein the functional thin film comprises a first cover structure and a second cover structure, the first cover structure is located between the second cover structure and the conductive barrier layer, and the display device further comprises:
    a housing surrounding the driving substrate, the electronic ink layer, the conductive barrier layer, and the housing is located below the first cover structure.

15. A fabrication method of the display device, comprising:
    forming an electronic ink layer on a driving substrate;
    providing a conductive barrier layer, wherein the conductive barrier layer comprises a conductive layer located on the base layer; and
    adhering the electronic ink layer formed on the driving substrate and the conductive layer through an adhesive layer, wherein the adhesive layer is located between the electronic ink layer and the conductive barrier layer.

16. The fabrication method of the display device of claim 15, wherein providing the conductive barrier layer further comprises disposing a vapor barrier layer located between the base layer and the conductive layer.

17. The fabrication method of the display device of claim 15, further comprising:
    disposing a sealant between the driving substrate and the conductive barrier layer, and the sealant surrounds the electronic ink layer.

18. The fabrication method of the display device of claim 15, further comprising:

disposing a functional thin film on the driving substrate or the conductive barrier layer.

19. The fabrication method of the display device of claim 18, wherein a width of the functional thin film is smaller than or equal to a width of the conductive barrier layer, and the fabrication method of the display device further comprises:

disposing a housing surrounding the driving substrate, the electronic ink layer, the conductive barrier layer, and the functional thin film such that the housing extends onto a surface of the functional thin film facing away from the conductive barrier layer.

20. The fabrication method of the display device of claim 18, wherein a width of the functional thin film is greater than a width of the conductive barrier layer, and a difference between the width of the functional thin film and the width of the conductive barrier layer is greater 3 mm, and the fabrication method of the display device further comprises:

disposing a housing surrounding the driving substrate, the electronic ink layer, and the conductive barrier layer, wherein the housing is located below the functional thin film.

* * * * *